US 11,268,706 B2

(12) United States Patent
Colon et al.

(10) Patent No.: US 11,268,706 B2
(45) Date of Patent: Mar. 8, 2022

(54) PHOTOVOLTAIC-ASSISTED HEAT PUMP WATER HEATER SYSTEM AND METHOD

(71) Applicant: University of Central Florida Research Foundation, Inc., Orlando, FL (US)

(72) Inventors: Carlos J. Colon, Rockledge, FL (US); Danny S. Parker, Cocoa Beach, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 124 days.

(21) Appl. No.: 16/231,318

(22) Filed: Dec. 21, 2018

(65) Prior Publication Data

US 2019/0195513 A1    Jun. 27, 2019

Related U.S. Application Data

(60) Provisional application No. 62/609,276, filed on Dec. 21, 2017.

(51) Int. Cl.
*F24D 17/00* (2006.01)
*F24D 11/02* (2006.01)

(52) U.S. Cl.
CPC ...... *F24D 17/0021* (2013.01); *F24D 11/0221* (2013.01); *F24D 2200/123* (2013.01); *F24D 2200/14* (2013.01)

(58) Field of Classification Search
CPC .. F24D 17/0021; F24D 17/02; F24D 11/0221; F24D 3/18; F24D 2200/123; F24D 2200/14; F24D 15/04
(Continued)

(56) References Cited

U.S. PATENT DOCUMENTS 4,200,783 A * 4/1980 Ehret ............... F28D 20/0056
                                                    392/341
8,480,004 B2 * 7/2013 Farrell ............. F28D 21/0007
                                                    237/2 A
(Continued)

FOREIGN PATENT DOCUMENTS

AU    2016250449 A1 * 5/2018 ............. H02J 3/46
CA     2984227 A1 * 4/2018 ............ H02J 3/381
(Continued)

OTHER PUBLICATIONS

Parker, D., K. Sutherland, D. Chasar, J. Montemumo, and J. Kono, "Measured Results of Phased Shallow and Deep Retrofits in Existing Homes," Proceedings of the ACEEE 2014 Summer Study on Energy Efficiency in Buildings, 1:261-276. Washington, DC. Ed.: American Council for an Energy-Efficient Economy, Summer 2014.
(Continued)

*Primary Examiner* — Steven B McAllister
*Assistant Examiner* — Daniel E. Namay
(74) *Attorney, Agent, or Firm* — Tiajoloff & Kelly LLP

(57) ABSTRACT

A solar power system has a photovoltaic module that supplies electrical current derived from sunlight to a heater system of a hot water tank. The heater system uses the electrical energy from the photovoltaic module, and optionally also from a local power grid, to heat water up to a selected maximum stored hot water temperature. Control circuitry senses when the level of electrical power is below a threshold solar-power level, and in response sets the stored hot water temperature for the heater system to a first lower temperature value. The control circuitry also senses when the level of electrical power is above the threshold solar-power level, an in response sets the stored hot water temperature for the heater system to a second elevated temperature value higher than the lower temperature, making advantageous use of solar power when available. A mixing unit adds cold water to set the dispensed water temperature.

27 Claims, 9 Drawing Sheets

(58) Field of Classification Search
USPC .......................................... 237/8 R, 2 B, 56
IPC .................. F24D 17/02,11/02, 3/18, 15/04
See application file for complete search history.

(56) References Cited

U.S. PATENT DOCUMENTS

| | | | | |
|---|---|---|---|---|
| 9,146,039 | B2* | 9/2015 | Lester | H02S 40/44 |
| 9,261,284 | B2* | 2/2016 | Hayashida | F24D 19/1054 |
| 9,261,294 | B2* | 2/2016 | Long | F02C 3/28 |
| 9,400,122 | B2* | 7/2016 | Kim | F24D 3/08 |
| 9,845,958 | B2* | 12/2017 | Zemach | G05D 23/1917 |
| 10,072,853 | B2* | 9/2018 | Chaudhry | F24D 17/0021 |
| 10,571,135 | B2* | 2/2020 | Kreutzman | H05B 3/78 |
| 10,962,237 | B2* | 3/2021 | Stepa | H02J 3/14 |
| 11,015,877 | B2* | 5/2021 | McKellar | F28D 20/02 |
| 2009/0183853 | A1* | 7/2009 | Chen | F24D 11/0264 165/48.2 |
| 2009/0188486 | A1* | 7/2009 | Thomasson | F24D 17/0021 126/585 |
| 2012/0042867 | A1* | 2/2012 | Fan | F03B 13/06 126/567 |
| 2012/0235478 | A1* | 9/2012 | Hayashida | F24D 19/1054 307/11 |
| 2013/0000699 | A1* | 1/2013 | Lester | F24D 17/0021 136/248 |
| 2013/0074827 | A1* | 3/2013 | Kim | F24D 3/08 126/641 |
| 2013/0270353 | A1* | 10/2013 | Long | F24D 19/1039 237/8 A |
| 2014/0112647 | A1* | 4/2014 | Lichtenberger | F24H 1/202 392/308 |
| 2014/0153913 | A1* | 6/2014 | Newman | F24H 1/202 392/451 |
| 2015/0226460 | A1* | 8/2015 | Zemach | F24D 19/1063 700/90 |
| 2015/0267923 | A1* | 9/2015 | Fan | F24D 3/08 62/235.1 |
| 2015/0354833 | A1* | 12/2015 | Kreutzman | F24D 17/0021 392/308 |
| 2016/0195284 | A1* | 7/2016 | Chaudhry | F24H 1/202 392/449 |
| 2016/0258635 | A1* | 9/2016 | Zemach | F24D 17/0021 |
| 2018/0238563 | A1* | 8/2018 | Stepa | H02S 40/44 |
| 2018/0252417 | A1* | 9/2018 | Komatsu | H02J 3/00 |
| 2018/0266701 | A1* | 9/2018 | Sofer | F24H 9/2021 |
| 2018/0320907 | A1* | 11/2018 | Betz | F25B 25/005 |
| 2019/0107294 | A1* | 4/2019 | Yabe | F24H 4/04 |
| 2019/0154275 | A1* | 5/2019 | Ogawa | F24D 19/1075 |
| 2019/0334350 | A1* | 10/2019 | Stepa | F24H 1/185 |
| 2020/0340717 | A1* | 10/2020 | Qadir | F25B 27/002 |

FOREIGN PATENT DOCUMENTS

| | | | | |
|---|---|---|---|---|
| EP | 1450110 A2 | * | 8/2004 | F24D 17/02 |
| FR | 2990016 A1 | * | 11/2013 | F24D 3/18 |
| FR | 3069909 A1 | * | 2/2019 | F24D 3/1091 |
| GB | 2446418 A | * | 8/2008 | F03G 6/02 |
| JP | 2011001713 A | * | 1/2011 | |
| JP | 2020148429 A | * | 9/2020 | |
| WO | WO-8808105 A1 | * | 10/1988 | F24D 17/0021 |

OTHER PUBLICATIONS

Maguire, J., Burch, J, Merrigan, T. and Ong, S., "Regional Variation in Residential Heat Pump Water Heater Performance in the U.S., National Renewable Energy Laboratory," NREL CP-5500-60295, Proceedings of the 2014 ASHRAE Winter Meeting, American Society of Heating, Refrigerating and Air Conditioning Engineers, New York, NY, Jan. 18-22, 2014.
Colon, C., Martin, E., Parker, D. and Sutherland, K., Measured Performance of Ducted and Space-Coupled Heat Pump Water Heaters in a Cooling Dominated Climate, Proceedings of the ACEEE 2016 Summer Study on Energy Efficiency in Buildings, 1:1-16. Washington, DC. Ed.: American Council for an Energy-Efficient Economy, Summer 2016.
Colon, C. and Parker, D., "Side-by-Side Testing of Water Heating Systems: Results from the 2010-2011 Evaluation," building America Partnership for Improved Residential Construction (BA-PIRC), FSEC-RR-386-12, Florida Solar Energy Center, Mar. 2013.
Slater, H., "Solar Hot Water: Which is better? PV + Heat Pump or Thermal," 2013 ACEEE Hot Water Forum, Atlanta, Georgia, Nov. 3-5, 2013.
Dougherty, Brian P., Fanney, A. Hunter, "Experiences with Using Solar Photovoltaics to Heat Domestic Water," Journal of Solar Energy Engineering, vol. 125, pp. 195-202, May 2003.
Aguilar, F.J., Aledo, S., and Quiles, P.V., "Experimental study of the solar photovoltaic contribution for the domestic hot water production with heat pumps in dwellings," Applied Thermal Engineering, vol. 101, pp. 379-389, Feb. 23, 2016.
http://neea.org/docs/default-source/advanced-water-heater-specification/qualified-products-list.pdf?sfvrsn=34.
Colon, C. and Parker, D., "PV-Driven Heat Pump Water Heater: Final Report," FSEC-CR-2043-16, Florida Solar Energy Center, (Revised), Apr. 24, 2017.
Denholm, P., O'Connell, M., Brinkman, G and Jorgensen, J., "Overgeneration from Solar Energy in California: A Field Guide to the Duck Chart," NREL/TP-6A20-65023, National Renewable Energy Laboratory, Nov. 2015.
Parker et al., "Phased Retrofits in Existing Homes in Florida Phase I: Shallow and Deep Retrofits," FSEC-CR-2018-16, Final Report, Florida Solar Energy Center, Feb. 2016.
GE Appliances, Specs and Details, (http://products.geappliances.com/appliance/gea-specs/GEH50DFEJSR), 2019.
Sparn, B. Hudon, K. and Christensen, D., "Laboratory Performance Evaluation of Residential Integrated Heat Pump Water Heaters," NREL/TP-5500-52635, National Renewable Energy Laboratory, Jun. 2014.
Widder, S, C. Metzger, J. Petersen, and J. McIntosh, "Interaction between Heat Pump Water Heaters or Other Internal Point Source Loads and a Central Heating System," PNNL-26447, Pacific Northwest National Laboratory, Richland, Washington, Aug. 1, 2017.
U.S. Energy Information Administration. 2018. State Electricity Profiles. U.S. Energy Information Administration. Jan. 25, 2018. https://www.eia.gov/electricity/state/.
T. Merrigan, J. Maguire, D. Parker, C. Colon, "PV-driven Heat Pump Water Heater Analysis, Testing, and Development, Quarterly Progress Report," NREL / DOE Internal, Jan. 2015.
Estimating the Opportunity for Load-Shifting in Hawaii: An Analysis of Proposed Residential Time-of-Use Rates, UHERO, http://www.uhero.hawaii.edu/assets/TOURates_8-2.pdf, Aug. 2, 2016.
Parker et al., "Potential of a Very High Efficiency Solar-Assisted Heat Pump Water Heater," FSEC-PF-472-18, Florida Solar Energy Center, Aug. 17, 2018.
Colon et al., "Measured Performance of a High-Efficiency Solar-Assisted Heat Pump Water Heater," F-SECT-PF-471-17, Florida Solar Energy Center, Published in Proceedings of the 9th Annual International Conference on Energy Efficiency in Domestic Appliances and Lighting, Sep. 13, 2017.
Colon et al., "Effect of Ducted HPWH on Space-Conditioning and Water Heating Energy Use—Central Florida Lab Home", FSEC-CR-2050-16, Florida Solar Energy Center, Nov. 2016.
C.Colon, "Florida PV-Driven Heat Pump Water Heater: Prototype Performance Results" slides presented atthe American Council for an Energy Efficient Economy (ACEE) Hot Water Forum, Feb. 26-28, 2017.
C. Colon, "Measured Performance of a High-Efficiency Solar-Assisted Heat Pump Water Heater", Proceedings of the 9th international conference on Energy Efficiency in Domestic Appliances and Lighting (EEDAL '17) Part III, pp. 890-899, presented Sep. 14, 2017.

* cited by examiner

PHOTOVOLTAIC-ASSISTED HEAT PUMP WATER HEATER SYSTEM AND METHOD

RELATED APPLICATIONS

This application claims the benefit of U.S. provisional application Ser. No. 62/609,276 filed Dec. 21, 2017, which is herein incorporated in its entirety by reference.

This invention was made with Government support under DE-AC36-08GO28308 awarded by the Department of Energy. The Government has certain rights in this invention.

FIELD OF THE INVENTION

This invention relates to the general field of solar power, and more particularly to the field of solar power used for heating water for buildings, especially dwellings.

BACKGROUND OF THE INVENTION

Solar powered photovoltaic (PV) systems have long been used to convert sunlight solar energy into electrical power that is provided to a building to power the electrical devices in it.

One issue with PV systems is that they produce power at varying levels depending on how much sunlight is present. When full-strength sunlight is present, the PV systems produce a substantial amount of electrical power, but at other times, e.g., when sunlight is weaker or at night, when the PV systems produce less or no electrical power.

Water heaters for buildings, especially dwellings, have also existed for many years. Generally, these water heaters have a tank in which water is heated and stored, and the hot water is then dispensed via pipes in the building on demand to those who want hot water. As the tank empties, more water is admitted to the tank and heated for further use.

Typically, water heaters have used natural gas or electrical power from a local energy grid to heat water that is stored in a tank in a building. Heating by natural gas is usually accomplished by burning the natural gas to heat the water. Heating by electrical power has typically used electrical resistance to convert electrical energy from the local power grid to heat that is transmitted to the water in the heater tank.

In recent years, hot water heaters have also begun to employ heat pumps that use electricity to move heat from one place to another instead of generating heat directly. Residential heat pump water heaters (HPWH's) operate based on the same principles of mechanical refrigeration technology used for air conditioning and refrigerators. An air source HPWH compressor utilizes electric energy and compressed hot refrigerant to transfer heat into a storage vessel containing heated water. In the refrigerant process, heat contained in the surrounding air is absorbed into the HPWH evaporator and cold air is expelled along with removed humidity in condensation as a byproduct. Manufacturers now offer residential type storage units with capacities typically in the range of 50 to 80 gallons. Due to the power efficiency of heat pumps, heat pump water heaters can be several times more energy efficient in using electrical energy than conventional electric resistance water heaters.

There are two conventional ways to potentially drive an electric HPWH with PV—using a direct current (DC) powered compressor or an alternating current (AC) compressor (which can be single or variable speed). In the case of single speed AC compressor which currently dominates market for such product, however, heat pump water heaters, are designed to operate with a steady supply of electrical power, such as that provided by a local power plant.

As a result, use of such a heat pump water heater (HPWH) would not interact efficiently with a variable source of electrical power, like a direct solar power system. For example, when sunlight and solar energy are present in abundance, a prior-art HPWH would only use part of the electrical energy to heat water, and then permit any excess electrical energy from the system to be lost, or transmitted from the solar power system into the local power grid. On the other hand, at night or at other times when the solar system is not producing electricity, the HPWH draws power from the power grid resulting in cost to the user.

SUMMARY OF THE INVENTION

It is therefore an object of the present invention to provide a solar-assisted powered system for providing hot water that improves efficiency and avoids the deficiencies of the prior art.

According to an aspect of the invention, this is accomplished by providing a solar power system including a microinverter, with a PV module that supplies electrical energy derived from sunlight connected with a water heater that heats water using electrical energy. Circuitry determines whether the solar power system is producing electrical energy above a predetermined threshold level, and responsive to that determination, increases the temperature to which water is being heated in the water heater to an elevated temperature that is higher than a lower operating temperature to which water is heated when the solar power system is producing power below the threshold level.

Preferably, the water heater is a HPWH and is provided with both an electrical resistance heating system and a heat pump heating system with an electrically driven compressor, as well as a connection to a local power grid to receive electrical energy. The compressor-driven heat pump works most efficiently to impart heat to water up to a predetermined maximum operating temperature of the heated water for the heat pump, e.g., 140° F. The electrical resistance heating system can be used to heat water at any temperature, with or without the heat pump. When the water in the tank is at a temperature above the heat-pump operating temperature, the electrical resistance heating system is used to heat the water in the HPWH tank, and it can heat the water to temperatures above the heat-pump operating limit, to, e.g., 160° F.

When the solar power system output is lower than the threshold and the temperature of the water is below the lower operating temperature, the water heater uses power from the power grid to heat the water using the heat pump to keep the water at the lower "normal" operating temperature (e.g., 125 F). When the solar power system output is higher than the threshold and the water temperature is below the elevated operating temperature, the solar power electricity is used to heat the water by powering the heat pump compressor, or with the resistance heating system if the compressor is not operating, up to the elevated operating temperature. Water that is heated to the elevated operating temperature is stored at that elevated temperature for periods when solar power is not available.

It is also an object of the invention to provide an electronic control system that administers the operation of the water heater, causing it to use electricity from the solar power system when available in the most efficient way possible, and to rely as little as possible on the power from the power grid.

It is also an object of the invention to provide a method of heating water using a PV assisted heat pump water heater.

It is further an object of the invention to provide a microinverter circuit that controls flow of AC current to and from the local power grid, and selectively uses electricity from solar energy generation to heat the water.

It is further an object of the invention that the system controller can be networked and addressed, facilitating communication with a remote user, whether it is via RF, cellular, land line, power line carrier or Internet communication.

The PV-assisted Heat Pump Water Heater (HPWH) system of the invention preferably has a residential compressor-refrigerant based storage type water heating system, Photovoltaic (PV) modules and micro-inverters with a programmable smart controller, which provide effective operation of the system. The smart controller of the system can be customized to operate with any available heat pump water heater on the market. Due to its flexible and programmable design, the controller allows optimization of solar resources and the heat pump (i.e., the compressor refrigerant system), and allows a programmed control of extended thermal energy storage, which can displace, shift and save electricity.

During daytime hours, the controller automatically changes the thermostat setpoint for compressor heating (e.g., up to 140° F. or max factory user setting) responsive to a determination based on real time measurement of energy generated from the solar PV modules and micro-inverters. These modules are matched in size (275-320 Wp each) to contribute to the HPWH nominal compressor load typically approximately 400 to 700 watts.

During compressor operation, the grid-tied microinverters provide energy according to the solar resources available. The microinverters do this by injecting electricity from the solar power system into the same single phase 240 VAC feed (i.e, electrical dedicated breaker) to which the heat pump water heater is also connected. The generated synchronized grid-tied electricity meets all or part of the energy utilized by the heat pump.

At some point during heating of the water, the temperature of the water reaches a predetermined limit temperature at which a factory thermostat of the HPWH generates an electrical command signal that stops the compressor. If at this point the controller senses that solar energy, i.e., electrical energy from the solar collectors, is available, electric energy is redirected and converted into heat via a staged electric resistance element which is positioned at the bottom of the tank.

The resistance element load is selected via a staged capacitive reactance circuit, with a relay selected by controller, that changes its impedance, in near-real time, to match the load to the amount or level solar-generated electric power available. It is expected that a multi-stage resistance heat element, i.e., a resistance heat element having two or more stages provided for heating at different respective ranges of electrical power, can replace a single resistance element with capacitive circuitry acting as multi-stage, with the individual manufacturer ultimately deciding the type of resistance heating element to implement depending on cost. One objective of the controller is to consume or store all electric energy generated by the solar power system as hot water, therefore avoiding electricity export into the grid. However, in the case of electric service utility demand or aggregation programs, control of bi-directional electric to and from the grid is allowed.

The controller can also be programmed to set back thermostat set point (e.g., 115° F.) at various hours of the day which can delay compressor heating recovery. It also allows the system to resume compressor operation at times when solar resources are at higher levels (e.g., after 10:30 am for fixed mount PV modules facing south). This leads to optimization of the solar energy available to achieve ultra-high efficiency heating performance.

Long term average monthly efficiencies or coefficients of performance (COP) have been measured at greater than 4.5, and as high as 7.0 during sunny summer in Florida. The system has demonstrated a I-year averaged COP of 5.4, and a daily average grid energy consumption of only 1.2 kWh per day, which is less than that of many refrigerators. Such a system easily provides hot water capacity for a typical family of four (59 gallons per day) as it regulates delivery temperatures to 125° F. via mixing valve.

In typical operation in Florida, the hot water stored in the heater has a temperature greater than 146° F. at sunset. The increased daytime hot water storage temperatures in the system allow the system to displace up to 2.1 kilowatt-hours of equivalent electricity. It also allows simple installation with a minimum of one or two PV modules for simplicity and reliability.

In addition, compared to solar thermal systems that require circulating lines and pumping fluid to the collector, there are no problems associated with freezing. Total system cost compares very well against other renewable water heating system technologies.

The PV-driven HPWH concept optimizes water heating controls that can be applicable to residential or small commercial systems. The PV-driven HPWH system provides the following features and benefits:

Reduction of grid power consumption for water heating compared to a standard HPWH;

Reduction of PV power sent to the grid;

Thermal energy storage of PV-supplied energy;

Ultra-high efficiency seasonal water heating (COP range 4.0-7.0; Average COP=5.4);

Adaptive thermostat control prioritizing compressor water heating relative to available solar resources (PV); and Time-of-day operating windows (thermostat fallback/extended standby, optimization of solar resources while minimizing discomfort).

A networked and addressable heat pump water heater controller capable of communicating with the user or utility service provider.

The high efficiencies demonstrated by the PV driven HPWH is capable of supplying 60 gallons of hot water typical of three bedroom family home using less than 1.5 kilowatt-hours per day.

Other objects and advantages of the invention will be apparent to those of skill in the art on review of this disclosure.

DETAILED DESCRIPTION

Figure 1:
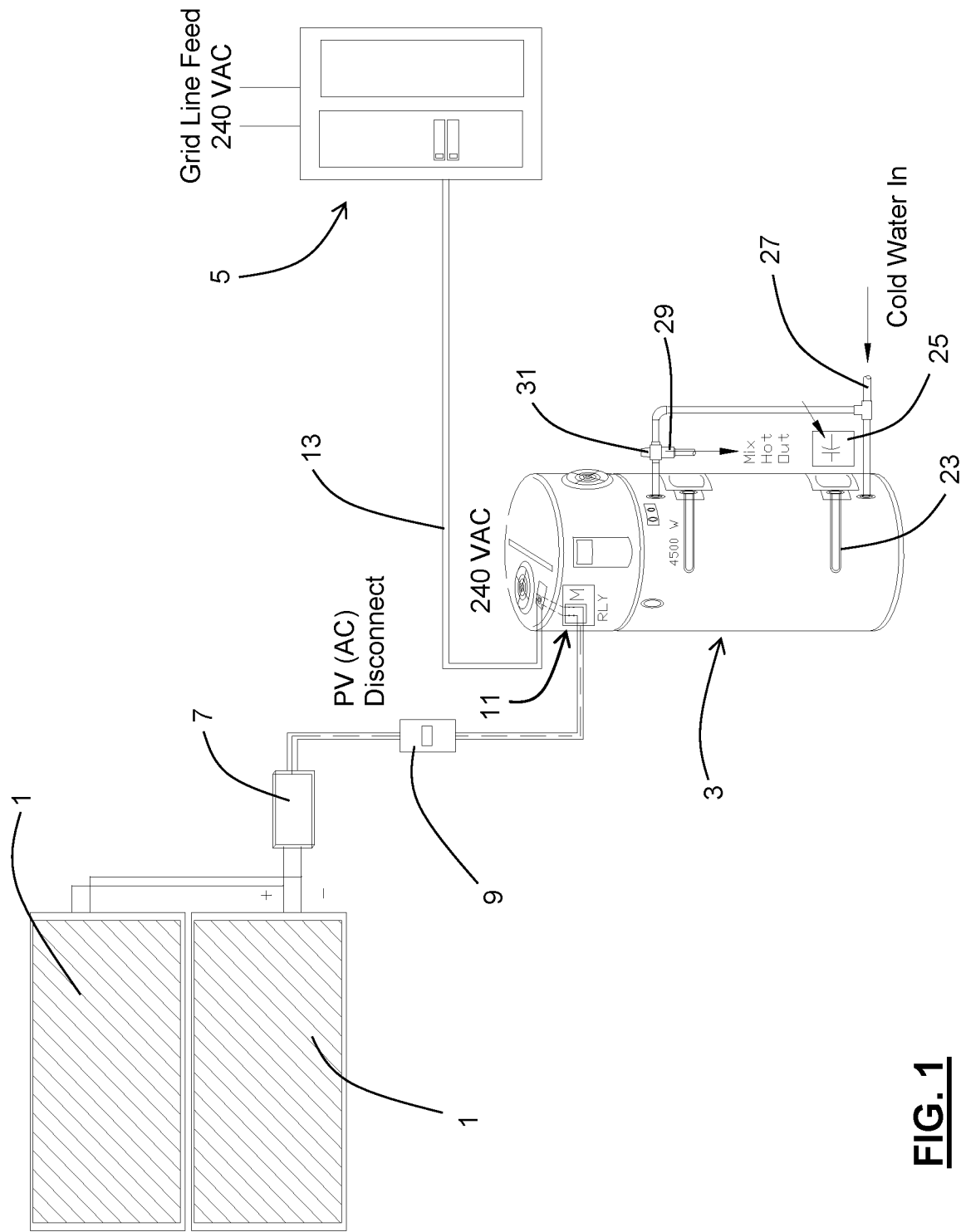
FIG. 1 is a diagram of a solar-powered water heating system of the invention.

Referring to FIG. 1, the PV assisted Heat Pump water heating system integrates one to three Photovoltaic (PV) modules or panels (range of 275-380Wp each), indicated at 1, a commercially available heat pump water heater (with capacity of 50 to 80 gallons), generally indicated at 3, and an add-on controller connected with the heater 3 and controlling supply of power to the heater 3 by electrical power from the photovoltaic system 1 and/or 240 VAC current from building connection to the local power-grid 5. The controller also controls the operation of the heater 3, as will be set out herein.

The Photovoltaic Modules

Referring to FIG. 1, two photovoltaic PV modules are provided in a location where sunlight acts upon them to cause them to produce electrical current.

Preferably, the PV modules are each a standard 60 to 70 cell module that provides DC voltage generally within a range of about 12 to 70 volts. According to one embodiment, the PV modules of the system are photovoltaics such as, but not limited to those sold by Canadian Solar under the model name Quartech CS6X PV modules, which are each made up of a 6×12 matrix of 72 polycrystalline 6-inch cells, with dimensions 76.93×38.7×1.57 inch. (1,954×982×40 mm). The Canadian Solar (CSGX) modules used produce a nominal maximum power of 310 watts, with a temperature characteristic of −0.43%/degree C. The optimum operating voltage (Vmp) is 36.4 volts, and optimum operating current (Imp) is 8.52 amperes. The efficiency of the modules in electrical conversion is 16.16%.

Microinverters

The PV modules 1 each generate a direct current that flows to microinverter 7.

In the embodiment of FIG. 1, the microinverter 7 connects though a PV AC disconnect 9 to interface circuitry or main controller module 11 that is also connected with 240 VAC power line 13 from the normal local power grid. Interface circuit 11 is connected with the water heater 3 and supplies power to it, as will be described herein.

In the event that a standard off-the-shelf microinverter is utilized for microinverter 7, the control module 11 is equipped with relays that interrupt or sever the internal 240 VAC current path connection that ties to the appliance power source connection 13 (i.e., the electrical panel). Therefore any microinverter would shut-off electric production per UL 1741 and electrical code requirements that mandate rapid shutdown.

Although a custom microinverter is not completely necessary to take advantage of some aspects of invention, a custom microinverter unit tied to a controller communications port would allow more flexibility and an assurance that no power would be back-fed into the electrical panel and the local power grid. It is expected that with the new generation of bimodal microinverters, which can either operate utility interactive (grid-tied) or stand alone, water heating can be provided when the system is disconnected from the grid given the right solar system size (e.g. three solar modules at 900 W) and solar conditions. The FSEC controller has the capability to measure the level of power, it can determine when to operate the compressor or engage any stage heating resistance (e.g., stages of 150 W and up) when the system is completely off the grid.

Figure 2:
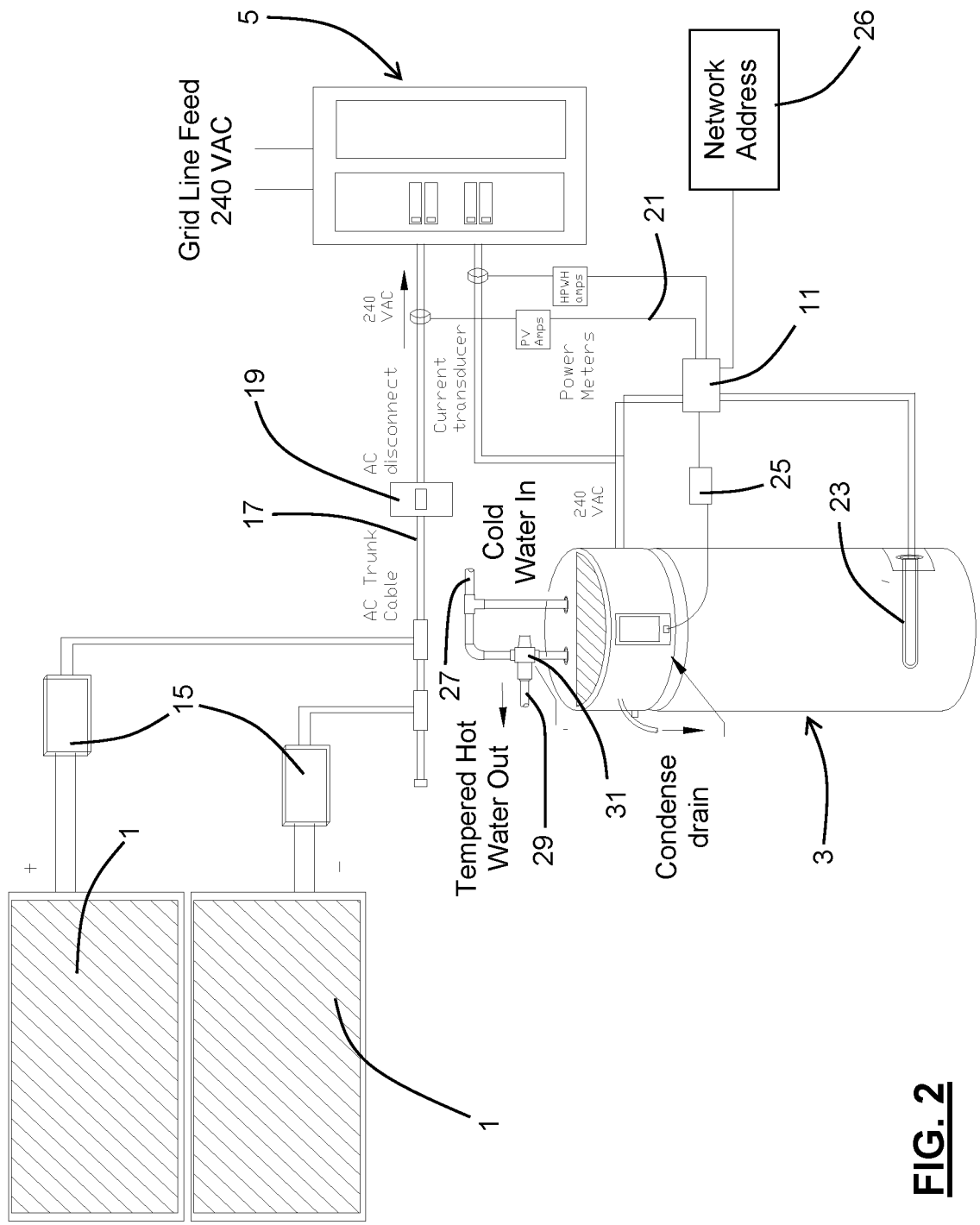
FIG. 2 is a diagram of a solar-assisted water heating system of the invention having an alternate embodiment of connections between the solar power modules, microinverters, the power grid and the water heater.

In the embodiment of FIG. 2, where the same numbers are used to reference similar parts, a different circuitry is employed to bring power from the PV modules 1. Each PV module is connected with a respective microinverter 15. Each of the two microinverters 15 converts the PV generated direct current into a respective synchronized (60 Hz) 240 VAC current, and injects that AC current into the same phase line 17 connecting from the distribution panel connected with the power grid 5. An AC disconnect 19 is connected in the 240 VAC power line 17 connecting with the local power grid, and this AC disconnect prevents AC flow from the microinverters 15 into the power grid. Power line 17 is sensed via wire 21 with controller circuitry 11 that is connected with the water heater 3 and controls its powered operation.

When integrating microinverters and photovoltaics, the voltage output of the PV modules needs to be compatible with the voltage input range of microinverters for proper operation. The microinverters 7 and 15 are selected to be compatible with the PV modules 1, specifically with output voltage range of the 72-cell (310 Wp) CS6X modules, however not limited to that particular brand or model.

The microinverters 15 according to the embodiment of FIG. 2 are Power-One Micro-0.3-I-OUTD microinverters, which have a nominal output power of 300 W, and a full power MPPT voltage range of 30-60 VDC. The maximum usable DC Input Power is 320 W, and the maximum usable current is 10.5 amperes (DC). Their absolute maximum voltage (Vmax) is 65 VDC, and the maximum output current is 1.25 amperes at 240 VAC. However any other brand of microinverter, such as an Enphase microinverter, can substitute since ABB/PowerOne may not be selling in the U.S. Connections from the PV modules 1 to the Power-One microinverters 7 is made using factory-terminated Amphenol H4 PV connectors. The 240 VAC current is delivered via proprietary trunk cable (41 inch) which connects the PV modules in a portrait or landscape arrangement, allowing connection to the electrical distribution panel in the building.

The system is scalable, depending on size (e.g., to accommodate a compressor electric load of 400 W-700 W and corresponding number and capacity of PV modules) needed to account for regional solar resources.

The Heat Pump Water Heater

As best seen in FIG. 1, another of the main components of the PV-driven water heating system is a residential type heat pump water heater (HPWH) 3. In the embodiment shown the water heater is a General Electric HPWH model GEH50DEEDSR or Geospring HPWH that is compliant under the 2012 DOE Energy Star Standards. The HCFC 134a based refrigerant compressor is rated at 600 watts.

The GE Geospring HPWH has a storage capacity of 50 gallons and rated with an energy factor (EF) of 2.45. The latest version, a GE HPWH (model no. GEH50DFEJSRA) manufactured as of June 2015, replaced previous version with a higher EF of 3.25. It is also rated as a 550 watt appliance, being 50 watts less than the model GEH50DEEDSR unit used, and it is also capable of providing a first hour delivery at 65 gallons. The GE manufacturing has now been sold to Bradford White water heating division, which currently utilizes the similar design and re-labeled under their name. The Bradford White Aerotherm Model RE2H in 50 or 80 gallon storage version replaces the mentioned GE Geospring line of heat pump water heaters. However, the controller part of the invention can be adapted to any brand electric heat pump water heater.

The Bradford White model RE2H heat pump specifications states a compressor room operating temperature range between 35° F. and 120° F. The unit has a uniform energy factor (UEF) of 3.39 and 3.48 assigned to the 50 and 80 gallons respectively. In addition, the Bradford White Aerotherm HPWH 140° F. thermostat setting is the highest factory-programmed temperature level a user is allowed to enter on the unit front keypad, the significance of which will be discussed below.

Referring to FIG. 1, whichever model of HPWH is employed with the system of the invention, the water heater has a reservoir or tank holding the water. A resistance heating element 23 is connected with controlling circuitry 25 so as to receive power when appropriate to heat water in the tank. The water heater 3 also has a cold water inlet 27 that admits cold water into the tank to keep it filled, as is well known on the art, and an outlet for heated water 29.

The outlet 29 includes mixing valve 31 that is connected to the hot water coming from the tank as well as the cold water available in the building. The mixing valve, such as the Honeywell AM-IO1, mixes the two sources of water as necessary to ensure that the temperature of water leaving the water heater 3 is never above a predetermined output temperature, e.g., 125 degrees F., selected by the user, usually by turning a dial on the mixing valve to select a preferred water temperature (120 to 135 degrees F.). The mixing valve 31 reduces the temperature of the heated water by mixing as much cold water into the outgoing heated water as necessary, even if the temperature of the heated water is substantially above the predetermined output water temperature. A scald protection is provided in the mixing valve 31. The scald protection cuts off all output of water from the water heater outlet responsive to a loss of pressure in the cold water supply.

Similar components are also present in the water heater of the embodiment of FIG. 2. The controller 11 may be implemented by a small microprocessor, such as a Raspberry Pi. The interface 25 for a GE water heater may be the Green Bean interface module available from FirstBuild.

The HPWH 3 also has a heat pump system for heating water, as has been described above and is well known in the art. The heat pump is driven by an AC powered compressor, and when turned on, it powers a heat-transfer cycle of refrigerant fluid that extracts heat from the surroundings and transfers it to the water in the tank.

All operation of the water heater 3 are controlled by the factory control circuitry or controller 11, accessing the water heater through any interface necessary. The control circuitry is itself connected as a node 26 on a network, LAN or the Internet, that has its own network address through which a user can communicate via a computer connected with the network with the controller 11 remotely and receive data from it or send instructions to it, as is well known with networked devices, which may support an access page on the network displayed to a browser on the user's computer when the node is accessed.

Control Circuitry

The control circuitry or controller module 11 includes connections to all of the real-time measurements used in the decision making (current sense input), controlling signals to the PV HPWH (thermostat serial setting output) and operational safety limits (safety disrupt/relay disconnect). The controller input and output features are illustrated on the diagram of FIG. 3.

The controller circuitry of controller 11 in the shown embodiment is a small micro-computer processor system, such as a Raspberry Pi processor or some equivalent circuitry. Generally, it comprises a processor chip and data memory operatively connected with the processor so as to be accessible to it, in the case of the Raspberry Pi, as solid state SD memory card. The data memory includes data defining stored computer instructions, i.e., software, that is executed by the processor to perform the functions of the control circuitry. The circuitry also has ports or other electrical connections, such as GPIO port controllers or a Greenbean controller connected via USB connection to the control circuitry 11, allowing input of data and output of commands.

The controller is network capable and addressable. The controller includes a link to a node 26 on a network, and through that node, the controller 11 can be accessed by an IP address assigned to the node, as is well known in the field of networked devices. The controller 11 by its software is configured to log and report events and to drive any other GPIO control pin upon command received via the network. For example the controller can be programmed to accept communication standards such as ANSI/CTA2045 standard for demand response of the water heater, AHRI standard 1380P or smart grid Open ADR.

The control circuitry is connected through the interface 25 and other connections to the sensors and components of the water heater 3. The controller receives data from a sensor 33 transmitting an electrical signal containing data indicative of the level of power production of the PV modules and microinverters. It also receives a signal containing data from the water heater electronics 35 in that indicate the operating status and power of the heat pump compressor. Data signals from a sensor 37 in the tank of the heater 3 indicate the current temperature of the water in the heater 3.

Based on these inputs and an internal clock 39, the controller 11 is configured to transmit several command outputs to various parts of the system.

Under appropriate conditions, the controller 11 can output a command along connection 41 that will cause the microinverter 7 or 15 to shut down immediately and disconnect from the system. In addition, through this connection 41, the controller can direct the source of electrical power, whether from the PV system or the local power grid, that is applied to the resistance heater or the compressor of the water heater 3.

The controller also can output a command to the electric resistance heater control circuit 43 causing the resistance heater to turn on, turn off or set a level of heating applied. Finally, the controller can transmit a command signal to the electronics 45 of the water heater that sets the thermostat setting for the desired temperature of water being heated in the heater 3, and turning the heat pump compressor on or off, as indicated by conditions.

Operation of the System

The controller system 11 is central to the performance of the system, and it acts as a dynamic smart thermostat that interacts with compressor or electric resistance heating and dynamic solar resources (PV) is implemented. The purpose of the controller is not to replace the OEM thermostat but to be able to communicate with the HPWH thermostat control, which is a primary way to coordinate efficient use of variably present electrical power from the PV modules.

A water heating thermostat on standard control in general is one level of control, but in contrast the present system increases energy storage with some level of optimization using a hybrid and highly efficient process of heating water with the assistance of photovoltaics.

In a stand-alone HPWH, compressor operation is normally limited to being triggered by the thermostat setting, which is usually 125-130° F. The present system increases run time based on solar radiation which leads to improved energy storage capacity and yields cooling byproduct which can be useful in southern hot-humid climate regions.

The controller interface is programmed to perform several functions:
  a) it evaluates solar electric production from PV/microinverters in real time;
  b) it decides when to bump up or down the temperature of the thermostat setting based on criteria "a)" and threshold levels (e.g., if 280 watts is available from the PV modules, then send a command to set the thermostat up to 140° F., otherwise revert setting to normal 125° F.);
  c) if the compressor is not operating, it can engage the resistive heat element to store additional heat;
  d) when the resistive element is engaged, the controller matches the resistance heat element electric consumption to the real-time available solar electric produced;
  e) the controller is equipped with real-time clock (RTC) and is programmable to set back thermostat setting.

Setting back thermostat (e.g., to 115° F.) can prevent, disrupt or delay compressor recovery heating, while still leaving a conservative hot water storage capacity for user comfort. For example—at midnight setting thermostat to 120° F. (may prevent recovery after late night showers) or during weekdays (8:30 am) setting to 115° F. after morning showers. Heating to 125° F. resumes at 10:30 am when solar resources are usually at higher levels—then the controller can engage the compressor for heating recovery. The thermostat may then be bumped to a higher temperature of 140° F. for extended heating if solar resources available. The controller also allows additional heat storage—via staged electric resistance—past the maximum temperature of compressor operation (typically 140° F.) during afternoon hours. Typical water temperature storage levels can reach 144° F. on average in Florida. Maximum temperatures of 147° F. on some days have been recorded.

The controller is also responsible for ending heating operation (maximum safe stored hot water) by interrupting microinverter electricity production, therefore ceasing hot water energy storage increases (e.g., when the household goes on vacation, the tank stored temperatures reach the 160° F. limit due to no hot water use activity). Although the controllers' main focus is to consume all electricity generated behind the meter (within the building site), the controller can also be programmed to bypass this feature to allow feeding back into the grid if a net metering agreement is in place.

Figure 4:
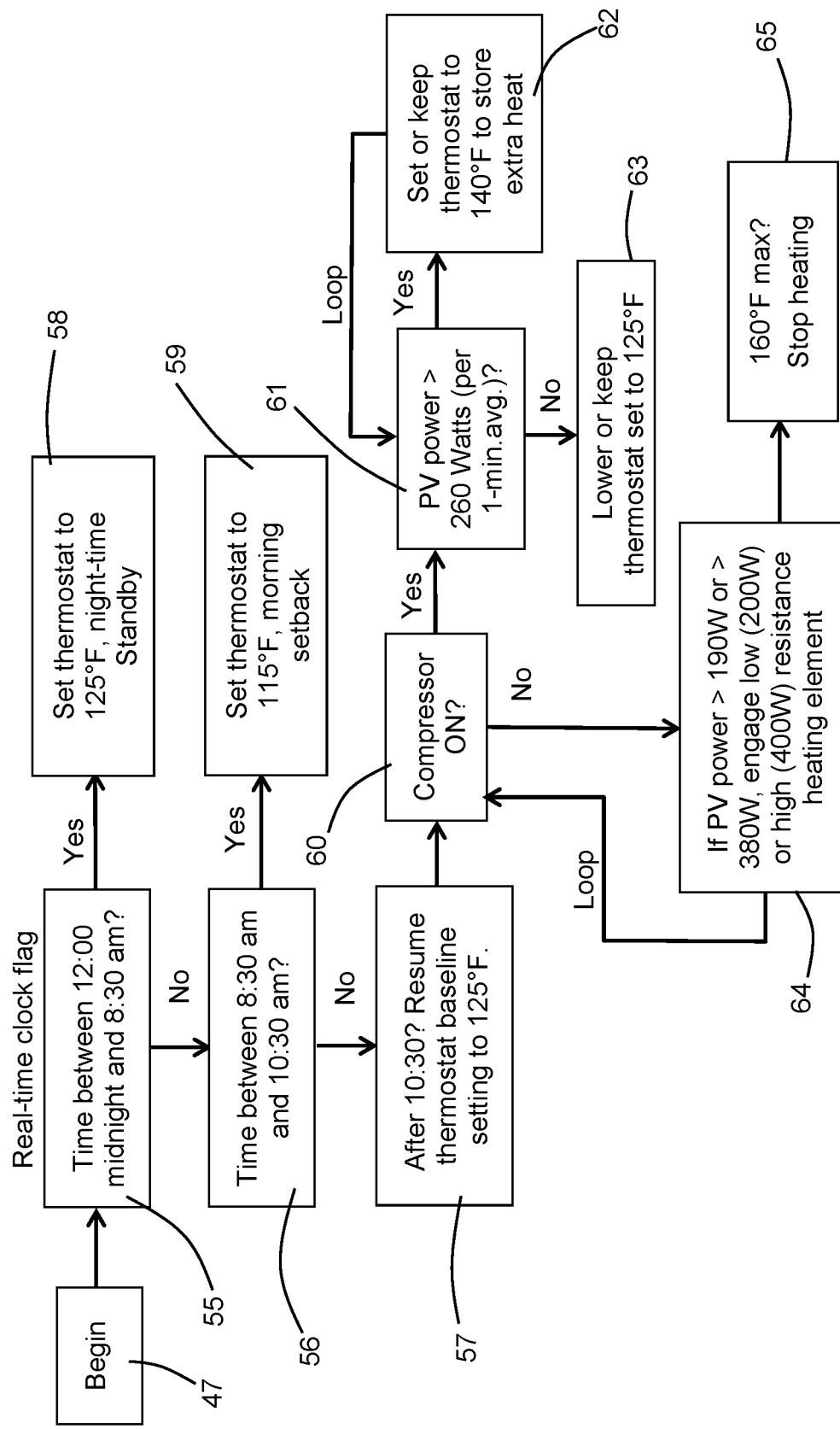
FIG. 4 is a flowchart showing the logic that controls operation of the system of FIGS. 1 and 2.

The thermostat logic flow chart of FIG. 4 illustrates one example of logic of the controller during daytime, as implemented by software stored in the memory of the controller 11 so as to be accessed by the processor of controller 11. Morning and late night setback are included in the diagram as they are a function of the real time clock to delay or disrupt compressor operation and can be nulled from the program and provided as an optional user feature.

The logic behind the controller can be defined in descriptive terms as follows.

While power is being generated by the PV/microinverter (as measured by controller) and while that power level is above a programmable threshold level (e.g., 140 watts), then the controller bumps up the compressor thermostat setting to engage or extend compressor operation.

When solar power generated levels are below the threshold, and the compressor is not operational, the controller engages discrete stage resistance heating. The power load level for resistive heating is selected via stage discrete steps at, or slightly above, the power generated available from PV/microinverters, whereas to store more energy until maximum storage level is achieved (i.e., 160° F. then shut-off), while avoiding injecting power into the grid. The resistance heater is connected to the PV power from the microinverters by a circuit, described below, that allows for operation of the resistance heater with varying levels, i.e., stages, of PV power.

Figure 5:
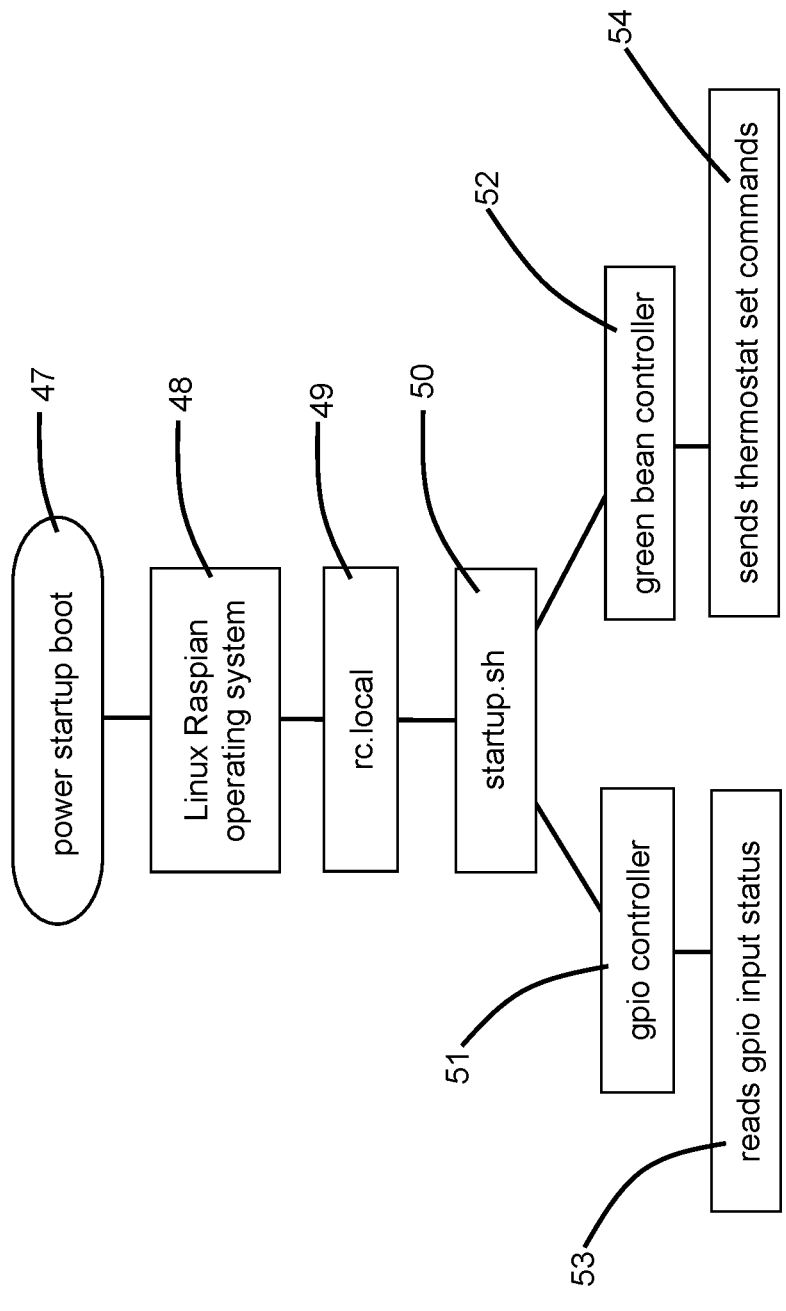
FIG. 5 is a diagram showing the operation of a specific system employing the invention.

Referring to FIGS. 4 and 5, operation of an exemplary system is illustrated. The architecture of the software of a Raspberry Pi-based system is seen in FIG. 5. When powered up at startup, step 47, the Raspberry pi processor loads its operating system (Raspbian), (step 48) invokes rc.local (step 49) which has a list of all processes to be run including startup.sh, a shell script (step 50). Startup.sh invokes the run command for JS Node and also a watchdog program that constantly monitors all programs. If something goes wrong in this procedure, the booting sequence re-starts the controller and attempts to fix itself by running whatever process it was doing again.

In a basic design, there are two parallel Javascript processes developed and written for the controller, gpiocontroller.js and gbcontroller.js, modules 51 and 52. These run under Javascript Node (Node.js) which can serve and run multiple processes by the controller operating system. More parallel processes can be added. For example, support for utility communication, access a cloud and send out data, etc.

Gpiocontroller.js, has control over and runs general purpose input/output (gpio) physical pins on the controller.

Gbcontroller.js runs the communications to the brain of the HPWH (via an interface controller), to the heat pump water heater factory appliance control board. It contains specific codes that invoke command action to the appliance, such as thermostat setting temperature. These commands are originally set by the manufacturer, including also a communication board that is proprietary to the manufacturer.

When needed, parallel processes (e.g., Java scripts) can also communicate through a socket, i.e., a Unix process where a file is created and two or more processes can access it (read and write), establishing a form of communication between them.

In addition watchdog programming is present that sends e-mails alerting when there is a thermostat setting change that was not acknowledged, and retries the command. This may also include electronic feedback to the processor.

In order for the controller 11 to make decisions, it receives signals from two devices, which physically originate with current sensors. One sensor detects the current intensity from the combined microinverters to produce an analog signal indicative of the strength of the PV power supplied, and connected circuitry translates that current sensor analog signal to a digital logic signal (high/Low, 3.0V or 0V). The other sensor simply detects when the compressor is running, an on or off digital signal. These two sensors are peripheral circuitry connected to the processor controller 11 that provides a form of measurement feedback in real time.

Referring to FIG. 4, after startup 47, the time is checked by a series of decisions 55, 56 and 57. These are usually not sequential decisions, but preferably the gpiocontroller.js javascript process program determines if any preset specific time or time windows are true which sets a flag that triggers one of the thermostat commands.

If it is between midnight and 8:30 am, there is normally neither sunlight not a lot of water demand, and the thermostat of the system is set to 120 degrees F., a nighttime standby condition 58. Power is supplied, if necessary from the power grid, and the operation of the HPWH is the same as in a non-solar-assisted heating system.

If the time is between 8:30 am and 10:30 am, the thermostat is turned down to 115 degrees F. for a morning setback phase 59. Operation usually relies on the power from the local grid, and whatever power flows form the PV modules in the early morning.

If the time is after 10:30 am, solar-based operations are in effect and the thermostat baseline is set to 125 degrees F. Generally, when the temperature of water in the heater is below the thermostat setting, it will switch the compressor on. Essentially, if the water temperature is below the thermostat setting, and environmental conditions are appropriate, i.e., ambient room temperature is between 35 and 120 degrees, the compressor of the heat pump will be turned on, powered by PV power if available, and drawing any additional power needed, if any, from the power grid.

If the compressor is on (decision 60) then the level of power produced by the PV modules is determined over a 1 minute sampling period average. If that PV power is above 260 Watts (decision 61), then the thermostat is elevated to 140 degrees F. (step 62), which keeps the compressor ON, with the PV power assisting, or completely powering, the compressor operation. In this application, 140 degrees was the maximum operating temperature of the heat pump. Using the heat pump powered or assisted by PV power is the most efficient way for the system to store the electrical energy as thermal energy in the heated water. Increasing the heat to 140 degrees provides for storage of thermal energy above the typical operating hot water supply function of the water heater. The outlet of the system will mix any such high temperature water with cold water for usage, which will be given as water at the mixing valve level set temperature. A loop maintains this level of heating until power from the PV modules drops below 260 Watts.

If the power from the PV modules is below 260 Watts, then the thermostat is left at 125 degrees (step 63), and the system operates relying on whatever PV power is available, and on power from the grid, to drive the compressor at a normal water heater temperature, e.g., 125 degrees F., not at an elevated energy storage setting.

If decision 60 determines that the compressor is not ON based on current sensor circuitry fed into GPIO pin, it is most likely due to the fact that the water in the heater is at the thermostat temperature, or the required water temperature is above the manufacturer-specified maximum output temperature of the heat pump. In either case, it is then determined every 10 seconds whether the PV power level is greater than 190 Watts (low power), or greater than 380 Watts (high power) based on feedback from microinverter current sensor. If the compressor is OFF and PV current is being generated, then the resistive heating element is activated to the preset stage level (220 watt (low) or 400 watt (high))(step 64). Step 64 is looped until true every 10 seconds or a maximum water temperature of 160 degrees F. is achieved, whereupon the relay transmitting power to the resistive element is opened, and the heating switched off. Resistive element heating only happens when compressor if OFF. The resistive heating element and compressor are not operated simultaneously (although they could if programmed to do so). The 160 degrees F. may be a hardware implemented limit, in that the hot water heater has a safety limitation that cuts all power to the heater elements and heat pump if the temperature reaches a preset hardware defined maximum permissible temperature of the water under any circumstances.

Exemplary Implementation

An implementation of the system was done using the GE Geospring HPWH. That HPWH offers 5 modes of operation (i.e., Heat Pump—Compressor only, Hybrid, High Demand, Electric and Vacation). The mode and thermostat setting of the HPWH is normally achieved via the built-in front user keypad on the unit.

During testing, the HPWH was set to operate in compressor only mode where it is most efficient. The manufacturer of the HPWH (GE) provides a user interface input jack for communications and control via a proprietary module (i.e., a Greenbean appliance module manufactured for General Electric by FirstBuild for interfacing with General Electric products).

Figure 3:
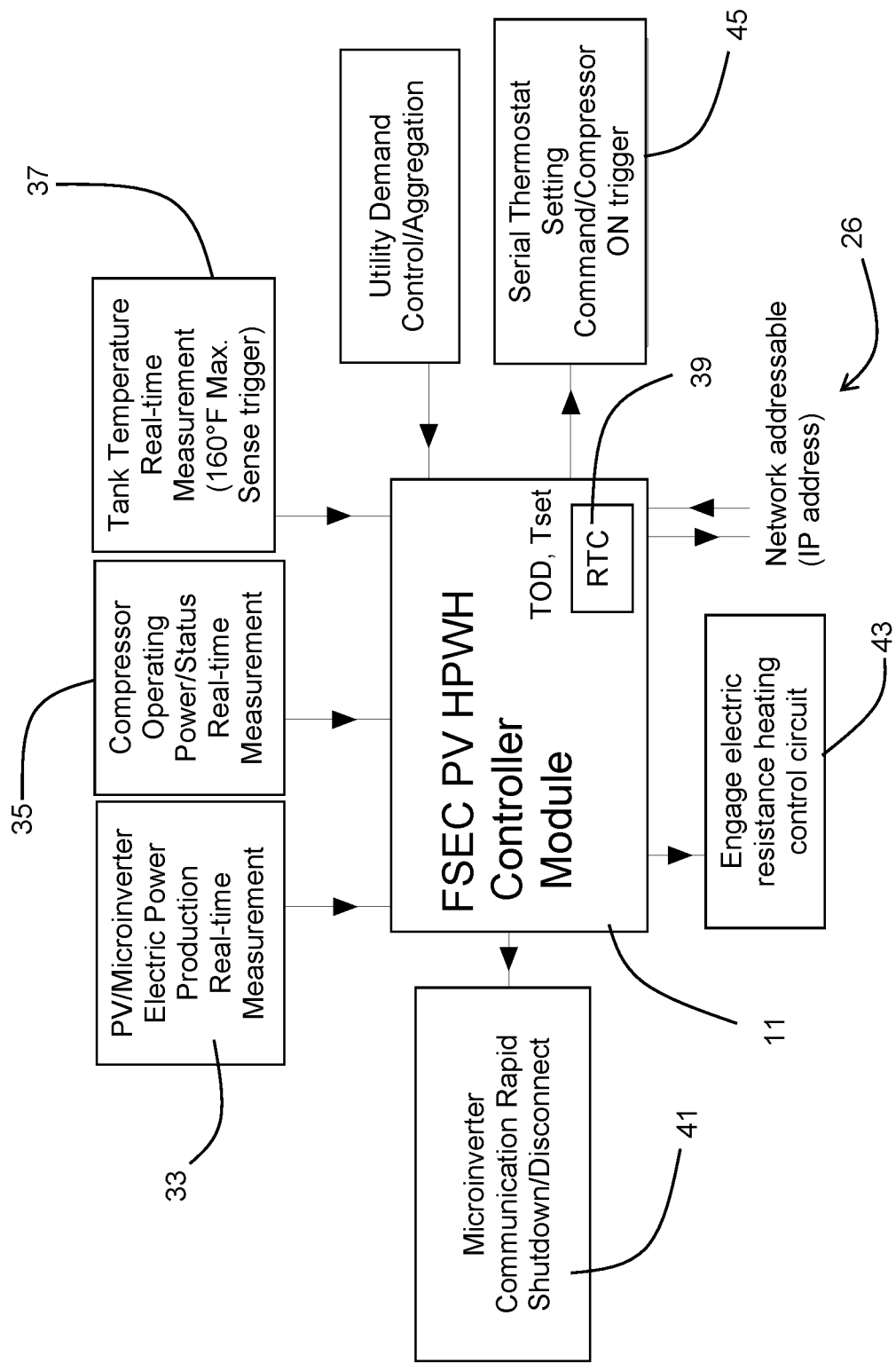
FIG. 3 is a diagram of the controller module that electronically administers the operation of the system of FIG. 1.

Customization of the PV driven HPWH control logic was developed to utilize as much of the compressor high efficiency operation, and its operation is shown in FIG. 3

The PV driven HPWH was programmed to invoke thermostat settings based on the following conditions:

Setback 120° F. (12:00 am-8:30 am), 115° F. (8:30 to 10:30 am)

Baseline 125° F. (resumed after 10:30 am)

Forced Storage 140° F. (anytime PV solar resource produce greater than 290 watts).

Setback, baseline or forced storage was automated via control program based on specific time of day and PV solar electric production. The automatic baseline setting of 125° F. between 10:30 am and midnight was maintained as long as daytime solar resources did not reach a predetermined minimum threshold.

When microinverter electric energy production, as measured in near real time and averaged over I-minute period, amounted to greater than 260 Watts, a command was sent to the HPWH to raise the thermostat setting to 140° F. This in turn operated the compressor, provided that its programmed thermostat deadband was not satisfied. The decision making to setting the thermostat to 140° F. or lower it to 125° F., was continually evaluated every minute based on the averaged measured solar energy availability. Alternatively, forced storage above 140° F. may be achieved by directing the output of the microinverters to the resistance heater of the water heater when the temperature exceeds 140° F., up to a level such as 160° F.

Resistance Heating Circuitry

The resistance heating element 23 has a fixed resistance. Supporting circuitry allows for discrete power load stages for the fixed electric resistance heating element 23. This allows the resistance heater to be used with varying levels of electrical power from the PV modules.

Figure 6:
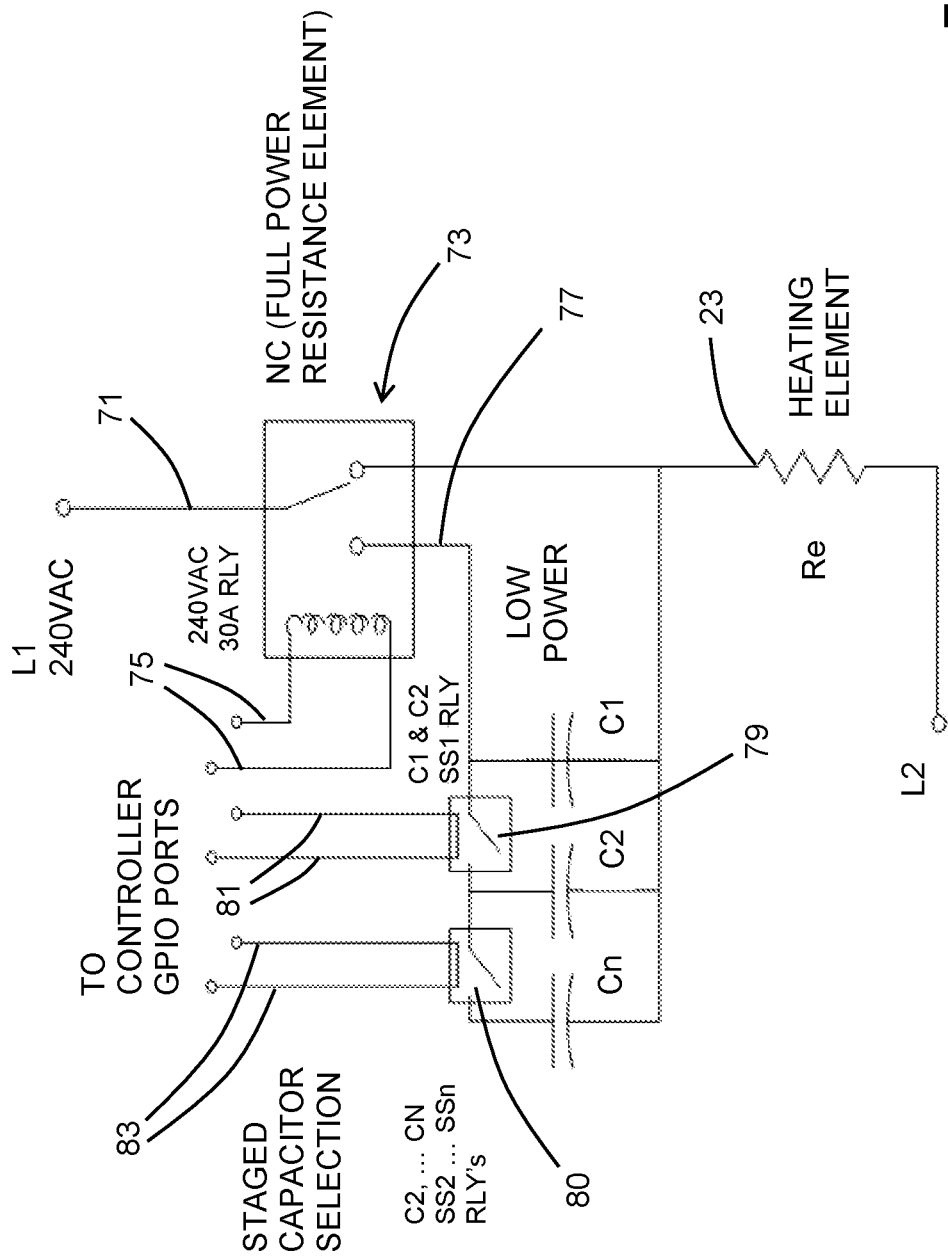
FIG. 6 is a schematic of a portion of the circuitry of the system that supplies variable amounts of power to the electrical resistance heating system of the water heater.

The 240 VAC electrical network connection to the resistance heating element 23 is shown in the schematic of FIG. 6. The circuit provides a series capacitance network, where the resistance is fixed and a capacitance value is selected to provide enough reactance to decrease the 240 VAC current and voltage, therefore presenting discrete levels of power load available for water heating to match the solar renewable availability.

The 240 VAC current is supplied through line 71 that leads to solenoid switch that is controlled by two contact wires 75 connected to the controller 11. When left open, switch 73 allows the full 240 VAC current to flow to the heating element 23.

When current is applied through wires 75 and switch 73 opens, the 240 VAC current flows to wire 77 that leads to an array of parallel capacitors C1, C2, and Cn. Capacitor values are chosen to provide series reactance taking into consideration the grid frequency (e.g., 60 Hz) and the resistance of the heating element (Re). The parallel arrangement is selectively provided by relays 79 and 80, which are controlled by the controller 11 through wires 81 and 83 connected to respective GPIO ports on the controller 11 that permit the controller to selectively open or close each relay, altering the pattern of capacitors wired in parallel. While three capacitors are shown here the number of capacitors arranged in parallel may be more than three.

In a commercial electric water heating system, where a known electric heating element resistance is known (e.g., Re=27.8 ohms, 2 kW@ 240 VAC), the controller would leave the normally closed 30A capable relay de-energized to utilize full power providing a faster heating recovery. By energizing the relay and sending current through the alternate path, capacitors are connected in series to the fixed resistance heat element. Staged capacitors can be switched in or out to provide capacitive reactance to the current path, therefore creating a multi-stage heating load which can be controlled from the main controller module general purpose input-output (GPIO) pins.

While the foregoing description relied to some degree on the existing thermostat of the HPWH, i.e., the controller sets the thermostat of the heater to cause it to start heating water at a higher temperature, the invention may also operate with a controller taking over the switch function of the thermostat so as to determine when to switch on the compressor or the resistance heater, and when to apply solar power or grid power to either of those mechanisms. The controller 11 detects the temperature of the water in the heater and the level of electrical energy being produced by the PV modules, and directs power from the local power grid, or from the PV modules if available, to the heat pump compressor or to the resistance heater so as to maintain a predetermined minimum water temperature, e.g., 125 degrees F. in daytime and 115 degrees F. at night. Then, when the electrical energy being produced by the PV modules reaches a threshold level, the circuitry causes that power to flow to the heat pump compressor and heat the water up to a temperature above the minimum temperature but less than a maximum operating temperature of the compressor of the heat pump. If electrical energy being produced by the PV modules is still above the threshold at that point, the circuitry directs that electrical energy to the resistance heater so as to heat the water to a temperature that is above the maximum operating temperature of the compressor. The heating with the resistance heater continues until the water temperature reaches a predetermined maximum temperature of the water, or until the amount of energy of the PV modules drops below the threshold. It may be noted that in a warm climate environment, extended compressor operation leads to additional cooling as a byproduct of the heat pump. The cooled air may be expelled from the unit which can be used for supplemental cooling or dehumidification.

In addition, it should be understood that in the system of the invention the water heater can serve as a storage for energy during off-peak periods that is available but not being used to compensate for power that would be used in peak periods. The water heater can store renewable or grid energy in the form of thermal energy stored in water by heating the water above the normal operating temperature of the water heater. That amount of thermal energy may constitute enough to save 2 to 3 kilowatt-hours (kWh) of demand for electricity from the grid at peak demand times. For example, in a 50 gallon water heater, the set operating temperature for water to be dispensed is from the water heater may be 125 degrees F. Electrical power from the grid or from the solar modules can be used to heat the water above 125 degrees F. to 150 degrees F., and it is stored at that temperature, and mixed with colder water when dispensed by the mixing valve 31 to the preselected output temperature. However, the added amount of thermal energy stored in the 50 gallons of water is (150 F−125 F)=25 F*50 gallons(*8.3453 gal to lb conversion)=10,431.6 Btu's*0.0002928=3.05 kWh's.

Dedicated Controller Circuitry

The system of PV-supported water heater above utilizes components that acting together provide the following functions:

a. measuring active solar PV/microinverter energy production power, such as by a dedicated watt-hour meter with a current-sensing transformer (CT) connected to the single-phase microinverter power output line feeding into an electrical distribution panel. In such a circuit, the watt-hour meter provides pulses to the data logger proportional to the energy being produced by the photovoltaics.

b. detecting operation status of the heat pump compressor, which may be based on pulses from a second watt-hour meter connected to the electric line carrying electrical power to the compressor of the heat pump water heater 240 VAC line. That watt-hour meter may serve a dual role for also taking efficiency measurements, that extended functionality is not needed—all that is needed is the capability of determining if the compressor is in operation, i.e., ON or OFF.

c. sending a logic signal to the FSEC controller (such as embodied above in a Raspberry Pi) via control port (that can be either High or Low) to invoke a change of thermostat setting (e.g., 140 or 120 F)—depending on solar power production as measured in (a) exceeding a predetermined threshold power level.

d. transmitting, via dedicated control ports, electrical current that controls power relays for heating resistor element stages (e.g. 200 W or 400 W) based on the level of solar power production determined in (a), but only when compressor is OFF as detected in (b).

This can be accomplished using relatively expensive components that provide extensive functionalities beyond those strictly necessary. For the purposes of cost reduction, however, dedicated circuitry may be used to sense items a and b above and generate appropriate output signals or electrical current.

Figure 7:
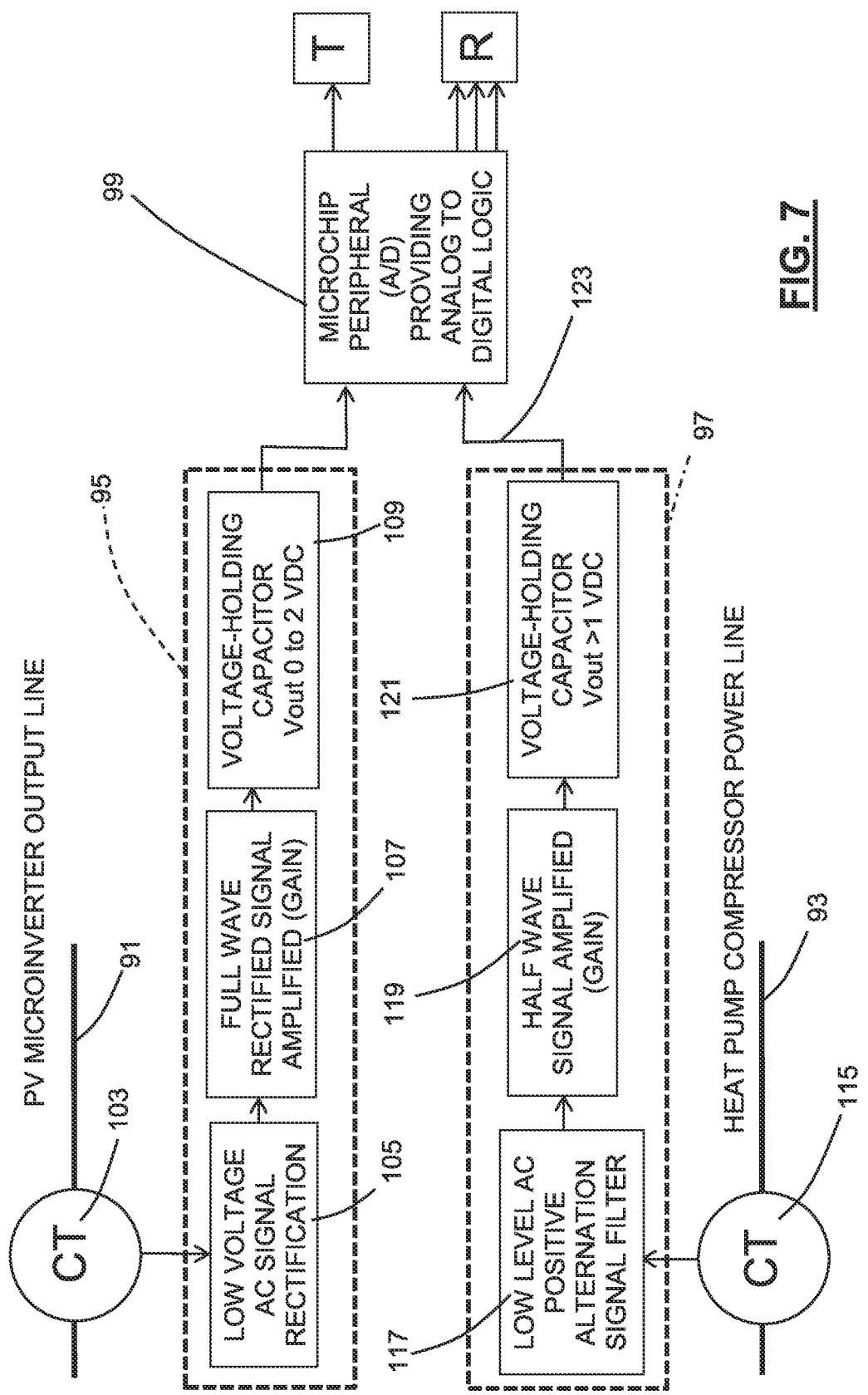
FIG. 7 is a diagram of a configuration of control circuitry for implementing the invention.
Figure 8:
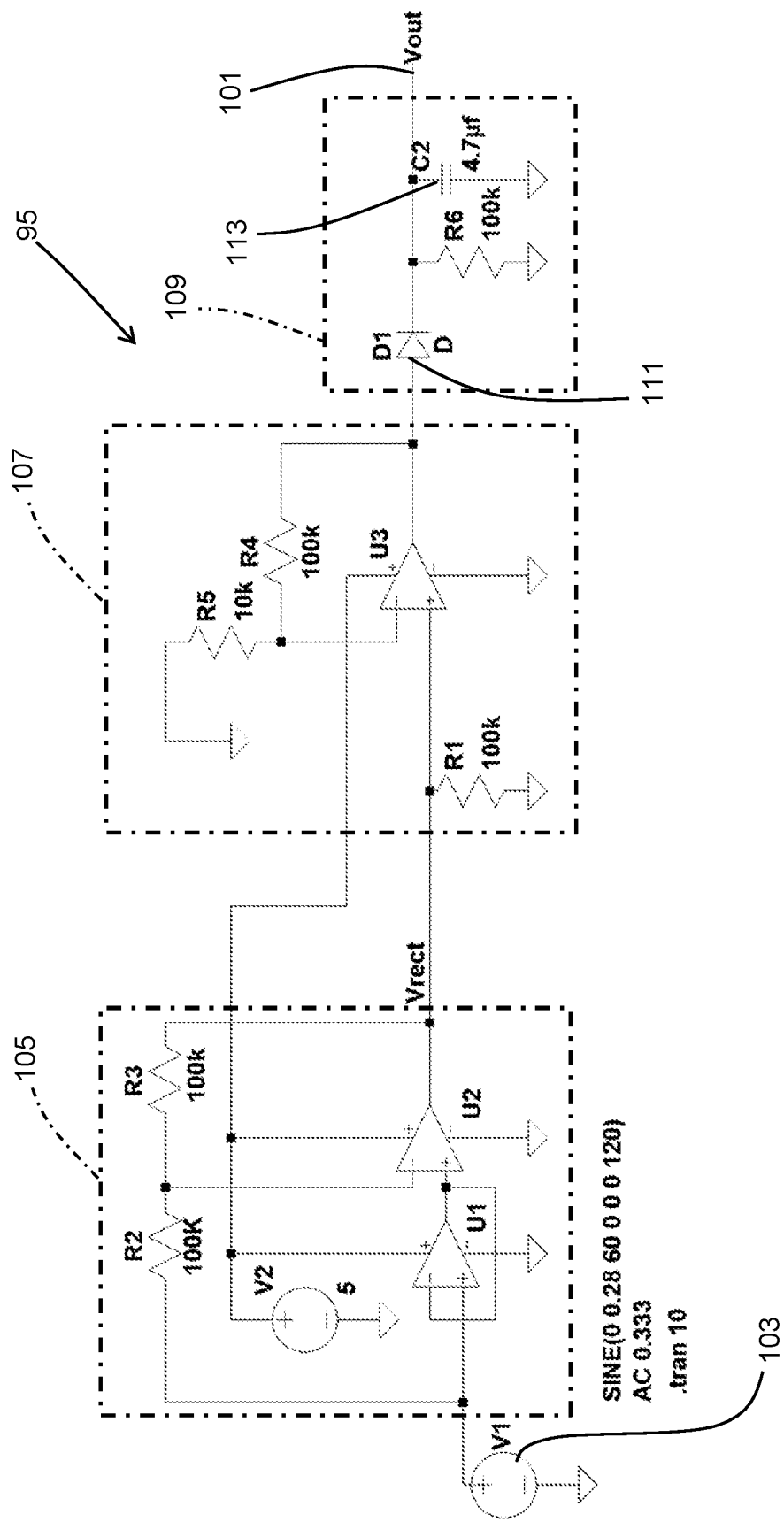
FIG. 8 is a more detailed diagram of the circuitry of FIG. 8 showing the portion of the circuit that detects the level of power being produced by the photovoltaic system.
Figure 9:
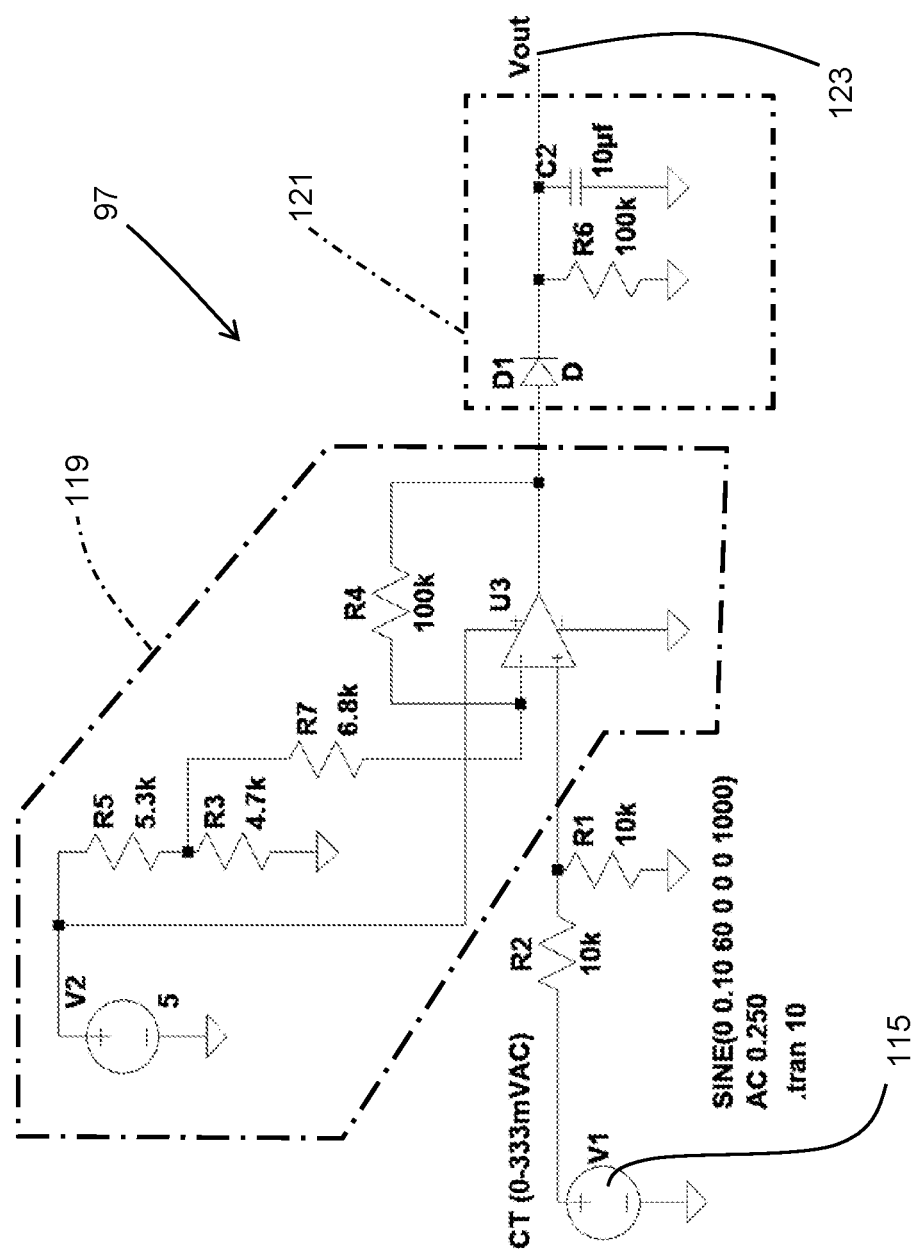
FIG. 9 is a more detailed diagram of the circuitry of FIG. 8 showing the portion of the circuit that detects the level of power being applied to the compressor of the heat pump of the associated water heater.

Logic functionality for items a to d above may be accomplished by using low cost circuitry as shown in FIGS. 7 to 9. In this circuitry, peripheral electronics are connected to the FSEC controller (implemented preferably by using a RaspberryPi as described above), which functions as an interface between the peripherals and the controller electronic circuitry of the hot water heater that sets the thermostat temperature for the heater and may control the heat pump and additional resistance heating elements.

The peripheral electronics seen in FIG. 7 detect the level of electrical current measured in the line 91 from the PV microinverter and the power line 93 to the heat pump compressor. In these electronics, analog (sense) circuitry 95 detects the microinverter single phase output line power level (item a) and analog sensing circuitry 97 detects the power being supplied to the compressor of the heat pump, which allows determination of its operational status (item b). The analog circuitry 95 and 97 is configured to transmit analog current associated with the power level in the associated line 91 or 93 to a microchip peripheral 99.

The microchip 99 is preferably a programmable low cost 28-pin microcontroller, such as Microchip 16F876 manufactured by Microchip Technology Inc., 2355 West Chandler Blvd., Chandler, Ariz., USA 85224-6199. The microchip 99 has analog to digital conversion capability, which measures the levels of the analog outputs of the sensing circuitry 95 and 97 and also provides control decision making (items c and d). Based on the programmed digital processing of the microchip 99, which operates essentially according to the flowchart of FIG. 4, the microchip 99 outputs electrical signals on output ports T and R that control, respectively, the setting of the water heater thermostat temperature by the water heater control circuitry and the flow of PV electrical power to the resistance heater.

The thermostat is accessed through output T by a connection to the FSEC RaspberryPi board, which acts as an interface connected to the controller electronics of the water heater. The other outputs R are connected with the resistance heater element via a capacitor board such as shown in FIG. 6, and its outputs are used to toggle the resistor heater element 23 on, or to different stages of heating depending on how much PV-generated electrical power is available. It is expected that the resistance heating element may be a single, double or three-stage resistance heating system, i.e., a resistance heating system that operates at one, two or three discrete ranges of power level, e.g., 200 W and 400 W, or 200 W, 300 W and 500 W. The combined peripheral circuit provides the same functionality as more expensive counterparts such as the capacitive reactance and power levels described above.

Referring to FIG. 7, the circuit peripherals connected to the FSEC controller consist of the programmable microcontroller 99 and circuitry 95 and 97 which feeds a voltage signal into an analog to digital (A-D) conversion provided by microchip 99. Two of the microcontroller input pins are configured as 10-bit A-D converters which measure item a, or detect item b as an ON/OFF determination. Four other pins are configured as logic outputs. Three of these logic outputs pins (R) control the power relays utilized for resistance heating stages which direct the current through the single heating element at the bottom of the tank, which may also be a two-stage or three-stage heater element, When there is more than one stage, the heater element 23 staging is performed by toggling the microchip output pins R (high or low), which engage relays in the power circuitry as seen in FIG. 6. The relays connect or disconnect paralleled capacitors in the single phase 240 VAC line in series to the resistance element—effectively introducing capacitive reactance to series connected heating element. By introducing reactance, current and power is controlled as staged resistive heating (e.g., 200 W, 300 W and 500 W).

Another method of accomplishing a similar control result for the resistor heating element would be to provide for the water heater a custom-manufactured heating element with triple resistance connections, where each resistance section is connected via relays adding or removing resistance.

The FSEC controller (RaspberryPi) invokes a thermostat setting command to the HPWH controller electronics based on logic status of a dedicated input pin (e.g., Hi=140 F, Low=120 F) from T. The FSEC RaspberryPi interface board itself does not have circuitry to filter analog low level AC signals nor does it have a built-in analog to digital converter. The peripheral circuitry shown in FIGS. 7 to 9 provides those capabilities and the same control functionality at a much lower cost.

The sensing circuit 95 produces a DC voltage proportional to the low level AC signal provided by the current transformer 103 which is attached to the microinverter single phase current power line 91. The circuitry provides low-voltage AC signal rectification 105 to the output of the current transformer CT 103. The rectified signal is amplified by gain electronics 107, and the amplified signal is then used to set a voltage holding capacitor 109 that outputs a current along line 101. Analog voltage measurement coming out of the circuit is read by the microchip 99, which is a Microchip 16F876 microcontroller or any low cost programmable controller with analog-to-digital conversion capabilities. The microchip 99 is programmed to average voltages as read by its A/D converter taken 5-second intervals over a minute, i.e., twelve samples, and to then set its pin T to High (when the averaged voltage exceeds a predetermined threshold digital voltage value stored in microchip 99) or Low (where the average voltage is below that threshold), and that output at pin T causes the FSEC controller (RaspberryPi) to invoke a thermostat setting change. See FIG. 4, steps 61, 62, and 63.

The microchip 99 tracks the solar power generating levels for one-minute before it sends out a logic signal to the controller (RaspberryPi) to invoke a thermostat change, the criteria being that the solar level threshold must be maintained for one full minute before the microchip 99 sends out a thermostat change signal. This one minute sample period is provided because the reset of the thermostat will may cause the heat pump od the HPWH to turn on or off, and if the PV power production is sporadic for some reason near the threshold level, it would result in undesirable starting and stopping of the compressor.

The current transformer (CT) 103 connected to the current sensing circuit 95 is a current transformer selected based on amperage rating depending on the current being measured. In the present embodiment, a 5-amp split core current transformer is attached to the current carrying conductor wire 91 of the microinverter 7 or 15 (FIGS. 1 and 2). Attached to a 120 VAC output line 91, it provides a low voltage (AC) proportional to the AC current flowing thru the conductor.

Referring to FIG. 8, the circuitry 95 provides alternating current sensing circuitry (U1 & U2 rectification) and linear amplification (provided by U3) leading to voltage output (Vout) proportional to current measured by the current transformer 103, not shown but represented by the AC signal source V1. The current sense circuit 95 utilizes a quad OP amp chip (i.e., four operational amplifiers in one package), and the Analog Devices OP491 (instrumentation grade) is utilized for the current sensory circuit 95. The circuit 95 shown in FIG. 8 produces a variable analog voltage output from 0 to 2.0 V (DC) proportional to the alternating (AC) voltage provided by the CT 103. The current transformer (CT) sensor 103 is rated to produce an alternating voltage (0-333 mV AC) proportional to the current flowing thru the power line conductor. The circuit (single-end input) utilizes two operational amplifiers (OP amps) operating as full wave rectifier 105 to the incoming low-level-voltage AC. The OP amps runs from a single supply power source (+5V). The rectified signal is then amplified by a differential amplifier 107 with enough gain (gain=11) to surpass the minimum forward bias voltage needed to drive a Schottky (fast recovery) diode. The diode 111 prevents reverse (bleed) current from a voltage holding capacitor 113 in holding circuitry 109. The voltage output signal (Vout) is provided by the voltage holding capacitor (capacitance 4.7 μf) is fed to the A-D converter of the microchip 99.

The sensing circuit 95 voltage output (my) is correlated to power in line 91. The analog circuit voltage output in the 0 to 2.0 VDC range appears to be linear above the 100 watt power level in line 91.

The microinverter A-D current line sensing of the microcontroller 99 averages a few measurements (e.g., 3) within five seconds, and makes decisions based on solar PV provided current. Capacitive reactance stage switching via relays can therefore only happen at five second intervals.

The second current detection circuit 97 is used to determine heat-pump compressor operation (either ON or OFF). The CT 115 attaches to one of the power leads 93 on the compressor located inside the heat pump water heater unit. The detected voltage in that line 93 is subjected to a low-level AC signal filter 117, then a half wave signal amplification by gain 119, and the result is applied to a voltage holding capacitor circuit 121. Vout is transmitted via output wire 123 to microchip 99, where the analog current is processed by its A-D converter. When voltage (Vout) is greater than 1.0 volts, the microchip determines that the compressor is ON, which results in logic decisions made by the microchip as have been described herein. See FIG. 4, step 60.

The second current sensing circuit in FIG. 9 also utilizes a 0-333 mV AC output CT 115. Because the purpose of this circuit is simply to sense the operational status of the heat pump compressor (OFF or ON) the CT signal 115 is only amplified through a single operational amplifier 119 operating in summing mode. The amplified signal is sent to a capacitor holding circuit 121, which transmits the locked signal via line 123 to the microchip 99. An A-D converter in microchip 99 reads the voltage from line 123 and sets a digital value as a flag that the compressor status is ON based on a determination that the voltage from line 123 exceeds a predetermined threshold voltage value of 1 volt (DC).

The fourth output pin on the microcontroller 99 is used to send a logic (high) command to the Raspberry Pi to change thermostat setting temperature (High=140 F, Low is 125 F). Furthermore, threshold levels and any other specific thermostat setting temperature commands are fully programmable. Microchip 99 also provides decision-making and function by toggling output pins connected to power relays that switch flow of the solar-derived PC current to the resistor heating component or to the individual stages of a multi-stage resistor heating component of the heating system.

Microchip 99 also provides user level feedback via visual LED's corresponding to solar insolation levels low, medium and high (e.g., indicating solar power generating levels above 140 watts, 200 watts and 300 watts. A pin on Microchip 99 can also be configured to communicate to a serial LCD display providing user feedback.

It should be understood that the functions of adjusting the thermostat and the control of the resistor heater element are independent and may be employed separately depending on the installation. For example, the resistance heater 23 might be used in a system that does not employ the adjustment of the thermostat, and similarly, the upward adjustment of the thermostat may be advantageously applied even in the absence of a resistor heater element, i.e., a system with just a heat pump.

The terms herein should be read as terms of description not limitation, as those of skill in the art with this disclosure before them will be able to make changes and modifications therein without departing from the spirit of the invention.

What is claimed is:

1. A solar power water heating system comprising:
    a photovoltaic system that supplies electrical current derived from sunlight;
    a water heater having a heater system connected with and receiving the electrical current from the photovoltaic system, said heater system having a maximum temperature level setting and being configured to heat water in said water heater when the water in the water heater has a temperature below said maximum temperature level setting, and to discontinue heating of the water when the temperature of the water reaches said maximum temperature level setting;
    circuitry determining whether the photovoltaic system is producing electrical current above a predetermined threshold power level;
    wherein, responsive to a determination by the circuitry that the electrical current produced by the photovoltaic system is below said predetermined threshold power level, the circuitry sets the maximum temperature level setting to a first preset maximum water temperature; and
    wherein, responsive to a determination by the circuitry that the electrical current produced by the photovoltaic system is above said predetermined threshold power level, the circuitry sets the maximum temperature level setting to a second preset maximum water temperature that is higher than the first preset maximum water temperature of the heater system.

2. The system of claim 1, wherein the solar power water heating system has a connection to a local power grid and receives electrical power therefrom, and
    wherein the circuitry applies the electrical power from the power grid to the heater system when the water in the water heater has a temperature that is below the first preset maximum water temperature and the electrical current being supplied by the photovoltaic system is below the predetermined threshold power level.

3. The system of claim 2, wherein the heater system includes a heat pump heating the water in the water heater responsive to operation of a compressor thereof; and
    wherein said heat pump is powered by electrical power from the power grid when the water in the water heater is below the first preset maximum water temperature and the electrical current being supplied by the photovoltaic system is below the predetermined threshold power level; and
    wherein the heat pump is powered solely by electrical current from the photovoltaic system when the electrical current supplied by the photovoltaic system is above the predetermined threshold power level.

4. The system of claim 3, wherein the heater system switches off all electrical energy flowing to the heater pump compressor when the temperature of water in the water heater reaches the first preset maximum water temperature; and
    wherein the circuitry, responsive to the determination that the electrical current from the photovoltaic system is greater than the predetermined threshold power level, sets the maximum temperature level setting to the second preset maximum water temperature, and supplies the electrical current from the photovoltaic system to the compressor of the heat pump.

5. The system of claim 4, wherein, when the circuitry no longer determines that the electrical current produced by the photovoltaic system is above said predetermined threshold power level, the circuitry sets the maximum temperature level setting to the first preset maximum water temperature.

6. The system of claim 4, wherein the maximum temperature level setting is adjusted by the circuitry by interacting with a thermostat temperature control of the water heater.

7. The system of claim 2, wherein the system further comprises a resistance heater that heats water in the water heater when electrical power is applied thereto;
the circuitry applying the electrical current from the photovoltaic system to the resistance heater when the electrical current from the photovoltaic system is greater than the predetermined threshold level or another predetermined threshold power level set in the circuitry.

8. The system of claim 7, wherein the circuitry continues applying the electrical current to the resistance heater until the water temperature reaches a maximum operating heated water temperature for the water heater, whereupon all electrical energy to the heat pump and to the resistance heater is cut off.

9. The system of claim 8, wherein the water heater stores electrical energy in the form of thermal energy in water in the water heater by heating said water above the first preset maximum water temperature for water in the water heater, wherein the stored thermal energy is sufficient in amount to displace 2 to 3 kilowatt-hours (kWh) of electrical energy.

10. The system of claim 7, wherein the resistance heater has two or more stages, each stage being configured to provide heating for a respective range of power of the electrical current.

11. The system of claim 10, wherein the resistance heater has three stages of heating corresponding respectively to 200 W to 300 W, 300 W to 500 W, and greater than 500 W.

12. The system of claim 7, wherein the circuitry detects whether the compressor of the heat pump is in operation; and
wherein the circuitry causes the electrical power to flow to the resistance heater when the compressor is not in operation and the electrical energy from the photovoltaic system is greater than a second predetermined threshold power level that is different from the first predetermined threshold power level.

13. The system of claim 12, wherein operation of the compressor is determined by detecting flow of current in a power line to the compressor using a current sensing transformer.

14. The system of claim 7, wherein the circuitry causes the electrical current to flow to the heat pump compressor and to the resistance heater simultaneously when the electrical current from the photovoltaic system is greater than a second predetermined threshold power level that is different from the first predetermined threshold power level.

15. The system of claim 1, wherein the water heater has an outlet through which the heated water is dispensed, said outlet including a mixing valve connected with a source of cold water and mixing the cold water with the heated water in the water heater to produce water at a selected dispensing temperature lower than the temperature of the water in the water heater.

16. The system of claim 1, wherein the electrical current is determined by sensing power levels of the electrical current repeatedly over a period of time and averaging the levels thereof for comparison with the predetermined threshold power level.

17. The system of claim 16, wherein the photovoltaic system includes
a photovoltaic module; and
a microinverter receiving solar-generated power therefrom and outputting the electrical current as an AC current, and
wherein the level of electrical power produced by the photovoltaic system is detected by sensing the AC current produced by the microinverter using a current sensing transformer or other current sensor operatively associated with a power line carrying said AC current.

18. The system of claim 1, wherein a power level of the electrical current is detected by a watt meter.

19. The system of claim 1, wherein the circuitry is connected with a network so as to have a discrete network address, and the circuitry includes a processor and memory storing data that includes software executed by the processor, and pursuant to which a user can communicate over the network with the circuitry and monitor or control operation of the system.

20. A method for heating water using solar energy, said method comprising:
supplying water to a tank of a water heater;
receiving a grid electrical current from a local power grid;
converting sunlight to a PV electrical current with a photovoltaic system;
determining electronically whether the PV electrical current is above a predetermined threshold power level;
supplying grid electrical power to a heater system of the water heater only when the temperature of water in the tank is below a first preselected maximum water temperature and the power level of the PV electrical current is below the predetermined threshold power level, wherein the heater system does not use the grid electrical power to heat the water in the tank higher than the first preselected maximum water temperature;
responsive to a determination that the PV electrical current exceeds the predetermined threshold power level, supplying the PV electrical current to the heater system and interrupting supply of the grid electrical power thereto so as to heat the water in the tank with the PV electrical current to a second preselected maximum water temperature above said first preselected maximum water temperature; and
dispensing water from the tank wherein the water heater has a user-selectable water output temperature for the water from the tank, said dispensing including mixing the water from the tank with cold water in relative amounts such that the water dispensed is at approximately said water output temperature.

21. The method of claim 20, wherein the heater system includes a heat pump that heats water in the tank when electrical power is supplied to a compressor thereof, and the heating system includes a thermostat control that switches on power to the compressor when the temperature of water in the tank is below a settable water temperature of said thermostat control, wherein the settable water temperature is set to the first preselected maximum water temperature; and
wherein the supplying of the grid electrical power to the heater system is supplying of the grid electrical power to the compressor of the heat pump via the thermostat control.

22. The method of claim 21, wherein the method further comprises
automatically setting, responsive to the determination that the PV electrical current exceeds the threshold, the settable water temperature of the thermostat control to the second preselected maximum water, interrupting flow of the grid electrical power to the compressor and supplying the PV electrical current to the compressor through the thermostat control so that the PV electrical current causes the heat pump to heat the water to the second preselected maximum water temperature, at which point the thermostat control interrupts said PV electrical current flowing to the compressor.

23. The method of claim 21, wherein the heating system further includes a resistance heater configured to heat the water in the tank when electrical power is applied thereto; and the method further comprises
   determining whether the PV electrical current is greater than a resistance-heater threshold level, and
   responsive to a determination that the PV electrical current is greater than a resistance-heater threshold level, supplying the PV electrical current to the resistance heater so as to heat the water in the tank.

24. The method of claim 23, and
   determining whether the compressor of the heat pump is in operation; and
   wherein the PV electrical current is supplied to the resistance heater only when the heat pump compressor is not in operation.

25. The method of claim 23, wherein, where the PV electrical current is greater than a resistance-heater threshold level and predetermined threshold level, and the temperature of water in the tank is below a settable water temperature of said thermostat control, said resistance heater and the heat pump both are powered to heat the water in the tank simultaneously.

26. The method of claim 21, wherein the photovoltaic system comprises at least one photovoltaic module and at least one microinverter producing the PV electrical current as an AC current, and
   said electronic determining including sensing the PV electrical current using a current sensing transformer or other current sensor operatively associated with a power line carrying said AC current.

27. The method of claim 26, wherein the electronic determining incudes determining the PV electrical current by repeatedly sensing levels of the AC current over a period of time and comparing an average of the AC current levels to the predetermined threshold level.

* * * * *